(12) United States Patent
Suyama

(10) Patent No.: US 10,194,242 B2
(45) Date of Patent: Jan. 29, 2019

(54) CONTENT PLAYBACK DEVICE, CONTENT PLAYBACK METHOD, AND NON-TRANSITORY COMPUTER-READABLE STORAGE MEDIUM

(71) Applicant: Yamaha Corporation, Hamamatsu-shi, Shizuoka (JP)

(72) Inventor: Akihiko Suyama, Hamamatsu (JP)

(73) Assignee: Yamaha Corporation, Hamamatsu shi (JP)

( * ) Notice: Subject to any disclaimer, the term of this patent is extended or adjusted under 35 U.S.C. 154(b) by 0 days.

(21) Appl. No.: 15/599,715

(22) Filed: May 19, 2017

(65) Prior Publication Data
US 2017/0257703 A1 Sep. 7, 2017

Related U.S. Application Data

(63) Continuation of application No. PCT/JP2015/082768, filed on Nov. 20, 2015.

(30) Foreign Application Priority Data

Nov. 21, 2014 (JP) .................. 2014-236331

(51) Int. Cl.
*H04R 3/12* (2006.01)
*H04M 1/725* (2006.01)
(Continued)

(52) U.S. Cl.
CPC ............... *H04R 3/12* (2013.01); *H04L 67/18* (2013.01); *H04M 1/72572* (2013.01); *H04W 4/02* (2013.01)

(58) Field of Classification Search
CPC ....... H04R 3/12; H04W 4/02; H04M 1/72572
(Continued)

(56) References Cited

U.S. PATENT DOCUMENTS

| 7,492,913 | B2 * | 2/2009 | Connor | ................. | H04R 1/403 |
| | | | | | 381/77 |
| 2010/0219966 | A1 * | 9/2010 | Tsukagoshi | ............ | H04S 7/303 |
| | | | | | 340/686.1 |
| 2010/0260348 | A1 | 10/2010 | Bhow et al. | | |

FOREIGN PATENT DOCUMENTS

EP  1 542 204 A1  6/2005
JP  2004-251471 A  9/2004
(Continued)

OTHER PUBLICATIONS

Kirk et al., "A Location-Aware, Service-Based Audio System", Consumer Communications and Networking Conference, Jan. 2005, pp. 343-347, XP010787661, Piscataway, New Jersey.
(Continued)

*Primary Examiner* — Melur Ramakrishnaiah
(74) *Attorney, Agent, or Firm* — Crowell & Moring LLP

(57) ABSTRACT

A content reproduction apparatus includes a content reproducer configured to reproduce content, a user identifier configured to identify a specific user, a determiner configured to determine a place to which the specific user belongs, based on information of a distance with respect to a terminal carried by the specific user, and a result of identification performed by the user identifier, and a controller configured to, based on the information of the distance with respect to the terminal, cause the content to be output in the place to which the specific user belongs, and inhibit the content from being output in another place.

6 Claims, 10 Drawing Sheets

(51) Int. Cl.
*H04W 4/02* (2018.01)
*H04L 29/08* (2006.01)

(58) Field of Classification Search
USPC ............. 700/94; 381/77, 82; 340/686.1
See application file for complete search history.

(56) References Cited

FOREIGN PATENT DOCUMENTS

| JP | 2007-74710 A | | 3/2007 | |
|---|---|---|---|---|
| JP | 2007074710 A | * | 3/2007 | |
| JP | 2010-200212 A | | 9/2010 | |
| JP | 2010200212 A | * | 9/2010 | ............. H04S 7/303 |
| JP | 2011-199795 A | | 10/2011 | |

OTHER PUBLICATIONS

European Search Report issued in counterpart European Application No. 15862113.6 dated Mar. 7, 2018 (eight (8) pages).
International Search Report (PCT/ISA/210) issued in PCT Application No. PCT/JP2015/082768 dated Jan. 12, 2016 with English translation (five (5) pages).
Japanese-language Written Opinion (PCT/ISA/237) issued in PCT Application No. PCT/JP2015/082768 dated Jan. 12, 2016 (three (3) pages).
English translation of document C2 (Japanese-language Written Opinion (PCT/ISA/237)) issued in PCT Application No. PCT/JP2015/082768 dated Jan. 12, 2016 previously submitted on May 19, 2017 (Four (4) pages).
Japanese-language Office Action issued in counterpart Japanese Application No. 2014-236331 dated Nov. 6, 2018 with English translation (five (5) pages).

\* cited by examiner

CONTENT PLAYBACK DEVICE, CONTENT PLAYBACK METHOD, AND NON-TRANSITORY COMPUTER-READABLE STORAGE MEDIUM

CROSS REFERENCE TO RELATED APPLICATIONS

This application is a continuation of PCT application No. PCT/JP2015/082768, which was filed on Nov. 20, 2015 based on Japanese Patent Application (No. 2014-236331) filed on Nov. 21, 2014, the contents of which are incorporated herein by reference.

BACKGROUND OF THE INVENTION

1. Field of the Invention

The present invention relates to a content reproduction technique for reproducing content, and outputting the content in a plurality of places.

2. Description of the Related Art

Conventionally, a system which can output arbitrary content from an arbitrary one of speakers that are disposed respectively in rooms has been proposed. In the system, the user selects content to be reproduced, and further selects a room where the content is to be output. Then, the selected content is output in the selected room. When the user moves to another room, the user changes the room where the content is to be output, and then can listen the content also in the other room.

JP-A-2011-199795 proposes a system in which it is detected whether each of rooms is manned or unmanned, and a music is reproduced in a manned room, whereby a place where the music is to be reproduced can be changed following the movement of the user.

In the conventional system, when the user moves to another room, the user must newly select a room where content is to be output, and inhibit the content from being output in the room where the user has stayed (turn off the power supply of a speaker, or select the mute mode). Therefore, it is necessary for the user to perform cumbersome operations.

The system disclosed in JP-A-2011-199795 can be used only in the case where one person alone is in the house. In the case where persons are, for example, in two rooms, respectively, content is reproduced in the both rooms, i.e., the content is output also in the room other than that where a specific user (the user who instructs the system to reproduce the content) stays.

SUMMARY OF THE INVENTION

In one or a plurality of modes of the invention, therefore, it is a non-limiting object to provide a content reproduction apparatus, content reproduction method, and content reproduction program which, without requiring cumbersome operations, can reproduce content that a specific user instructs to be reproduced, in a place corresponding to movement of the specific user.

In order to achieve the above objections, there is provided a content reproduction apparatus comprising:

a content reproducer configured to reproduce content;

a user identifier configured to identify a specific user;

a determiner configured to determine a place to which the specific user belongs, based on information of a distance with respect to a terminal carried by the specific user, and a result of identification performed by the user identifier; and a controller configured to, based on the information of the distance with respect to the terminal, cause the content to be output in the place to which the specific user belongs, and inhibit the content from being output in another place.

There is also provided a content reproduction method comprising:

identifying a specific user;

determining a place to which the specific user belongs, based on information of a distance with respect to a terminal carried by the identified specific user, and a result of identification of the specific user; and based on the information of the distance with respect to the terminal, performing a control to output content in the place to which the specific user belongs, and a control to inhibit an outputting of the content in another place.

There is further provided that a non-transitory computer-readable storage medium, which includes a content reproduction program that causes a computer to execute the content reproduction method.

According to the disclosure, without requiring cumbersome operations, content that a specific user instructs to be reproduced can be output in a place corresponding to movement of the specific user.

DETAILED DESCRIPTION OF THE EXEMPLARY EMBODIMENTS

Figure 1A:
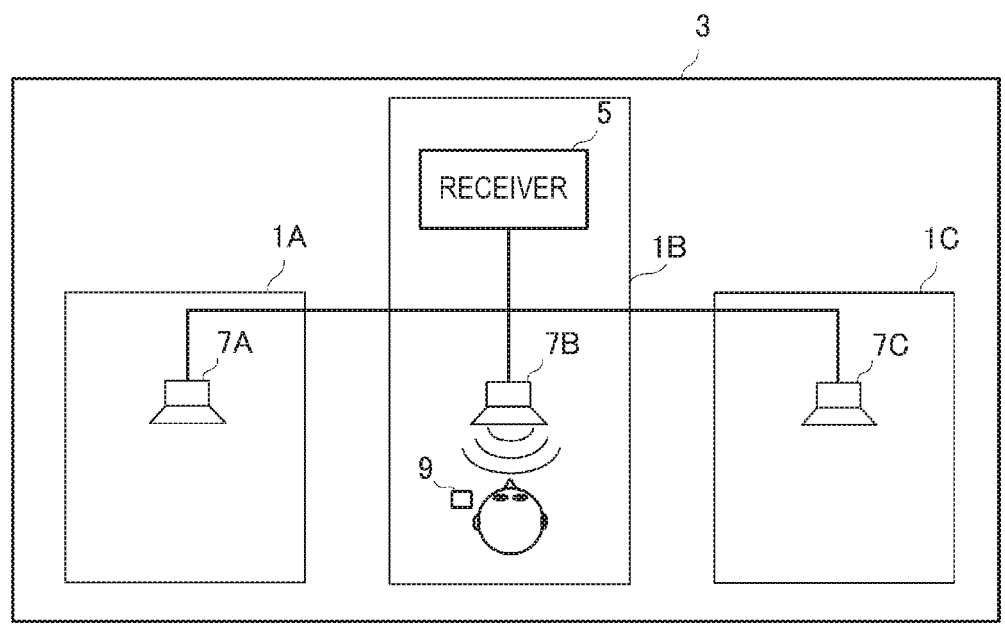
FIGS. 1A and 1B are diagrams of the whole configuration of a content reproduction system.

FIG. 1A is a diagram of the whole configuration of a content reproduction system including the content reproduction apparatus of the invention.

The content reproduction system includes a receiver 5, a speaker 7A, a speaker 7B, a speaker 7C, and a user terminal 9. The speaker 7A, the speaker 7B, and the speaker 7C are connected to the receiver 5. The speakers 7A, 7B, 7C constitute an example of a plurality of content reproduction units.

The speaker 7A is placed in a room 1A, the speaker 7B is placed in a room 1B, and the speaker 7C is placed in a room 1C. The receiver 5 is disposed at a predetermined position (in this example, the room 1B) of a house 3. The user operates the receiver 5 to instruct the system to reproduce arbitrary content.

Figure 1B:
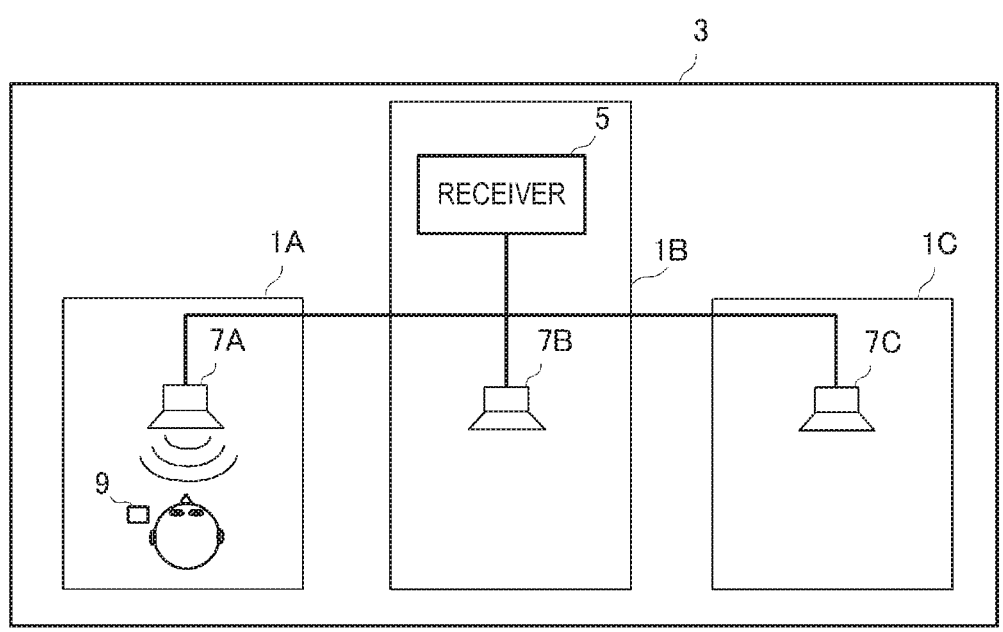

The user terminal 9 is a terminal which is to be carried by the user, such as a smartphone or a Bluetooth tag. The user carries the user terminal 9, and moves among the rooms. In FIG. 1A, for example, the user stays in the room 1B. When the user operates the receiver 5 to instruct reproduction of arbitrary content, the content is output from the speaker 7B of the room 1B where the user stays. In the content reproduction system in the embodiment, when the user moves to the room 1A as shown in FIG. 1B, the content is output from the speaker 7A of the room 1A, and operations of outputting the content in the other rooms are stopped. In the content reproduction system in the embodiment, therefore, the user can continue to listen the content that the user oneself has listened, also in the place to which the user moves, without performing cumbersome operations, and the content is not output in other places.

Figure 2:
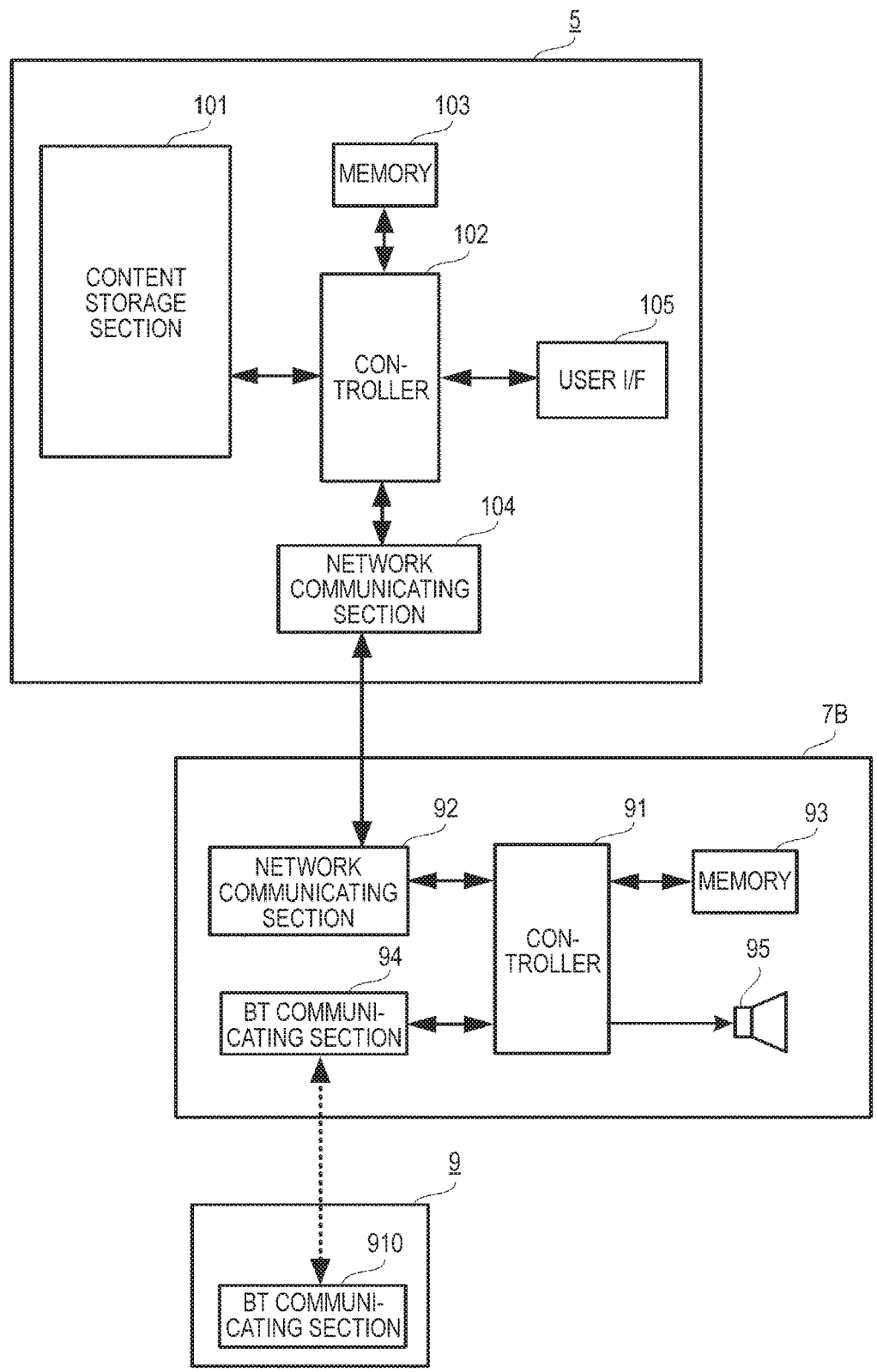
FIG. 2 is a block diagram showing configurations of a receiver, a speaker, and a user terminal.

FIG. 2 is a block diagram showing configurations of the receiver 5, the speaker 7B, and the user terminal 9. Although, referring to FIG. 2, the configuration of the speaker 7B will be described as a typical example, all of the speaker 7A, the speaker 7B, and the speaker 7C have the same configuration and function.

The receiver 5 which is an example of the content reproduction apparatus includes a content storage section 101, a controller 102, a memory 103, a network communicating section 104, and a user interface (I/F) 105. The content storage section 101, the memory 103, the network communicating section 104, and the user I/F 105 are connected to the controller 102. The controller 102 is an example of the controlling section.

The memory 103 stores programs (an OS and application programs) for operating the receiver 5. The controller 102 reads out the programs stored in the memory 103, and controls the operation of the receiver 5. Based on an operation of the user which is received through the user I/F 105, for example, the controller 102 reads out data (audio date) relating to content from the content storage section 101, and reproduces the data (this causes the controller 102 to function as the content reproducing section). In the case where the read-out audio data are compressed audio data, for example, the controller 102 decodes the compressed audio data to convert the data to a digital audio signal.

In this example, the example in which data relating to content are read out from the content storage section 101 in the own apparatus is described. Alternatively, a mode in which data relating to content, a digital audio signal, an analog audio signal, or the like is supplied from another apparatus may be employed.

The controller 102 outputs the digital audio signal relating to the reproduced content, through the network communicating section 104. In the example of FIG. 2, the controller 102 outputs the digital audio signal relating to the reproduced content, to the speaker 7B.

In FIG. 2, a mode is shown in which the network communicating section 104 conforms to the standard of a wired LAN, and the receiver 5 and the speaker 7B are connected to each other through a wired LAN. Alternatively, a mode in which the receiver 5 and the speaker 7B are connected to each other through wireless communication such as a wireless LAN may be employed. Alternatively, the receiver 5 and the speaker 7B may be connected to each other through a digital audio cable such as an S/PDIF. Alternatively, the receiver 5 and the speaker 7B may be connected to each other through an analog audio cable. In the case where they are connected to each other through an analog audio cable, the controller 102 converts the digital audio signal to an analog audio signal, and then outputs the analog audio signal. In this case, various kinds of information such as user identification information which will be described later are transmitted and received through another configuration (for example, switches or the like).

The speaker 7B includes a controller 91, a network communicating section 92, a memory 93, a BT (Bluetooth) communicating section 94, and a speaker unit 95. The network communicating section 92, the memory 93, the BT (Bluetooth) communicating section 94, and the speaker unit 95 are connected to the controller 91.

The memory 93 stores programs (an OS and application programs) for operating the speaker 7B. The controller 91 reads out the programs stored in the memory 93, and controls the operation of the speaker 7B. For example, the controller 91 converts a digital audio signal which is output from the receiver 5 through the network communicating section 92, to an analog audio signal. The analog audio signal is amplified by an amplifier (not shown), and output as sound from the speaker unit 95. The speaker unit 95 and the amplifier (not shown) are not limited to those which are incorporated in the speaker 7B, and may be separately outside the speaker.

The BT communicating section 94 transmits and receives a beacon signal according to the Bluetooth Low Energy standard (hereinafter, referred to as BLE). The user terminal 9 incorporates a BT communicating section 910, and also the BT communicating section 910 transmits and receives a beacon signal according to the BLE. The BT communicating section 94 receives the beacon signal transmitted from the user terminal 9.

The controller 91 measures the distance with respect to the user terminal 9 based on the reception radio wave intensity of the beacon signal which is received by the BT communicating section 94. The radio wave intensity is inversely proportional to the square of the distance, and therefore can be converted to information relating to the distance between the speaker 7B and the user terminal 9. Moreover, the beacon signal includes user identification information. The user identification information is specific information which is uniquely determined for each user, and information such as the serial number of the user terminal 9 or an MAC address.

The controller 91 transmits the user identification information, and the information of the distance with respect to the user terminal 9, to the receiver 5 through the network communicating section 92.

The controller 102 of the receiver 5 stores the received user identification information in the memory 103. At this time, the controller 102 stores content identification information (information such as a music title) indicating the currently reproduced content, and the received user identification information in the memory 103 in association with each other (this causes the controller 102 to function as the user identifying section which identifies the specific user). Based on the received information of the distance with respect to the user terminal 9, the controller 102 of the receiver 5 determines the place to which the user who carries the user terminal 9 belongs. Therefore, the controller 102 functions as the determining section that determines the place to which the specific user belongs. The receiver 5 may have a function of receiving setting performed by the user, such as "user setting button", and, when the user setting button is pressed, the closest user identification information and the content identification information may be associated with each other.

The beacon signal which is output from the user terminal 9 is sometimes received also by the speaker 7A or speaker 7C which is disposed in another room. In such a case, the user identification information and the distance information are transmitted from each of the speakers to the receiver 5. The controller 102 determines that the user stays in the room where the speaker which is closest to the user terminal 9 is disposed, transmits the digital audio signal to the speaker 7B, and does not transmit the digital audio signal to the other speakers.

Figure 3A:
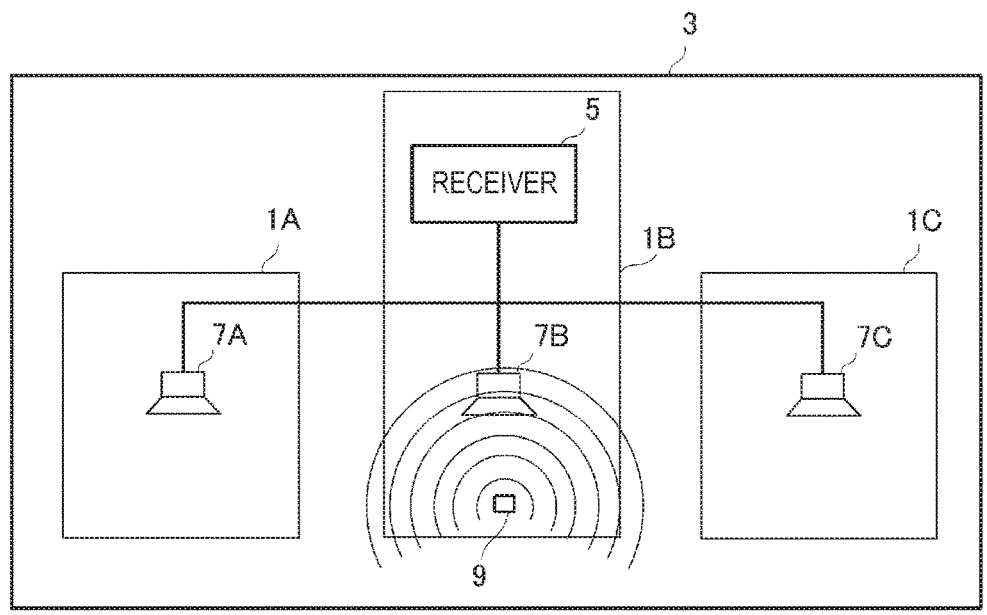
FIGS. 3A and 3B are diagrams showing a configuration for outputting content in rooms following movement of the user.

In the case where the user stays in the room 1B as shown in FIG. 3A, for example, the speaker 7B is closest to the user terminal 9. Therefore, content (music) is output from the speaker 7B, and the content is not output from the speaker 7A and the speaker 7C.

Figure 3B:
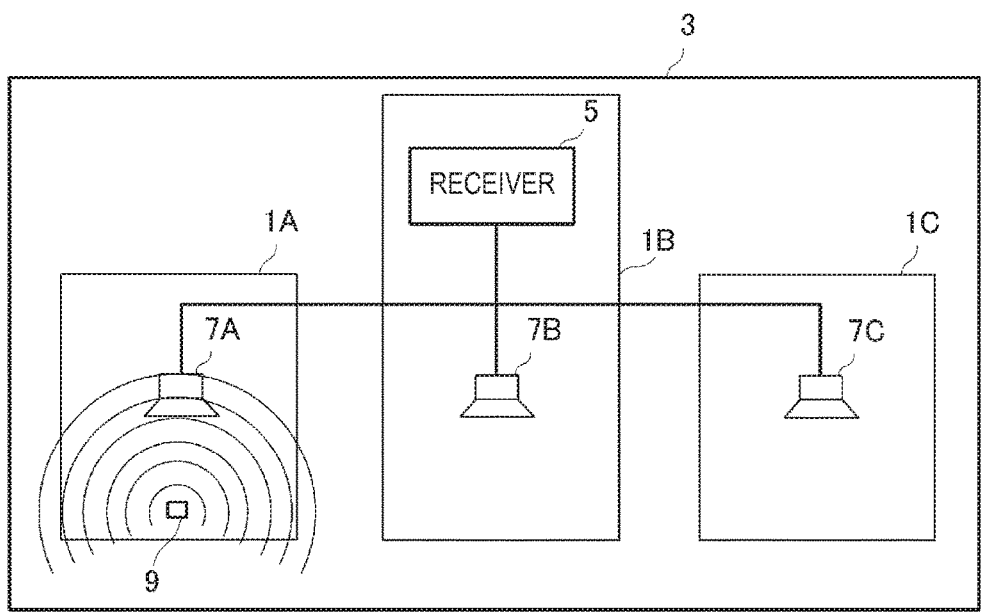

By contrast, when the user moves to the room 1A as shown in FIG. 3B, for example, the speaker 7A is closest to the user terminal 9. Therefore, the controller 102 of the receiver 5 transmits the digital audio signal to the speaker 7A which is closest to the user terminal, and does not output the digital audio signal to the other speakers. As a result, the content (music) is output from the speaker 7A, and the content is not output from the speaker 7B and the speaker 7C.

In the content reproduction system in the embodiment, as described above, the user can continue to listen the content that the user oneself has listened, also in the place to which the user moves, without performing cumbersome operations.

As described above, various kinds of information such as the user identification information and the distance information may be transmitted through a network (a wired LAN or a wireless LAN). Alternatively, a BT communicating section may be disposed in the receiver, and various kinds of information may be transmitted through the BLE.

The mode of controlling the content output may be performed in the following manner. For example, the receiver 5 transmits the digital audio signal to the all speakers, and further transmits information instructing a speaker to enter the mute mode, to the speakers other than the speaker of the room where the user stays (the speaker which is closest to the user terminal).

Although, in the above-described example, the mode in which the distance is measured by the radio wave intensity according to the BLE has been described as a detecting section that detects the place to which the user belongs, the detecting section may be realized by acquiring position information of the user terminal 9 by using, for example, the GPS. As shown in FIG. 4, alternatively, the place to which the user belongs may be detected by using switches (operation receiving sections) disposed in the rooms.

Figure 4A:
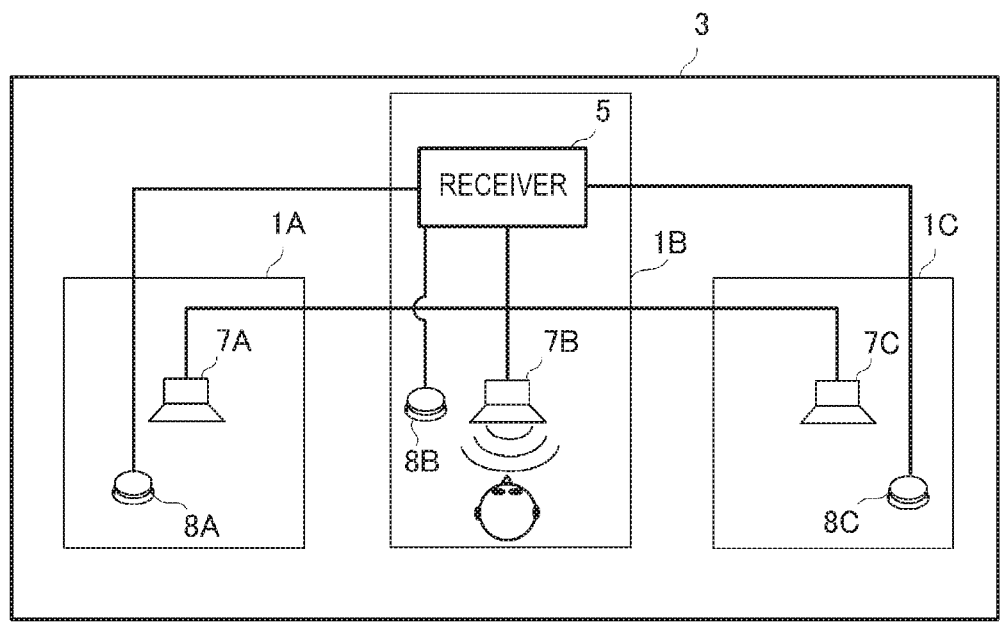
FIGS. 4A and 4B are diagrams showing a mode in which a place to which the user belongs is detected by using switches (operation receiving sections) disposed in the rooms.
Figure 4B:
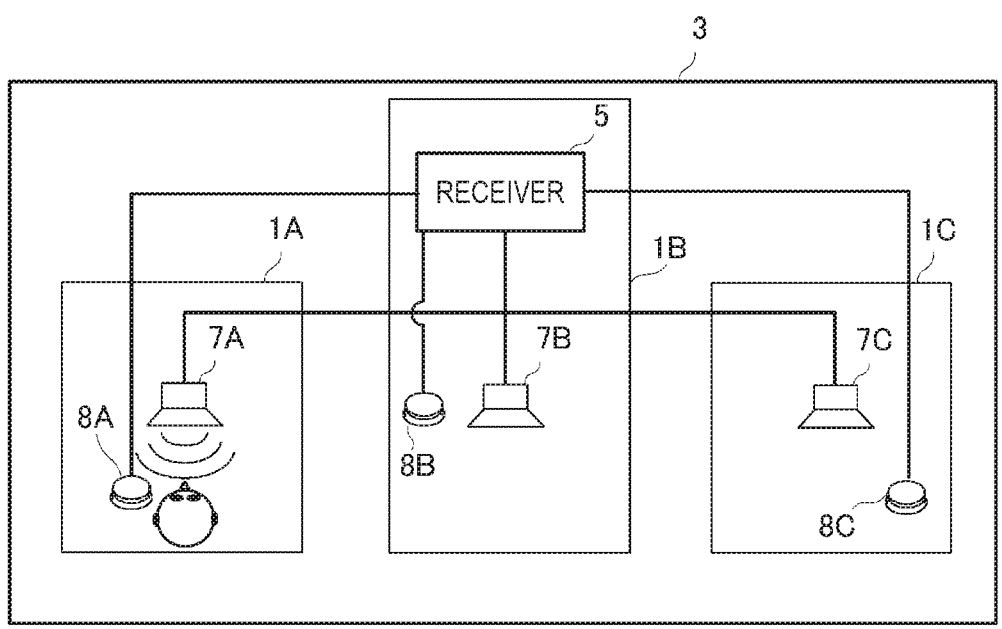

In a content reproduction system shown in FIGS. 4A and 4B, in place of the user terminal 9, a switch 8A is disposed in the room 1A, a switch 8B is disposed in the room 1B, and a switch 8C is disposed in the room 1C. The switch 8A, the switch 8B, and the switch 8C are connected to the receiver 5.

In the example of FIG. 4A, when the user enters the room 1B, the user operates the switch 8B. Information indicating the operation of the switch 8B is transmitted to the receiver 5. The receiver 5 transmits the digital audio signal to the speaker 7B of the room 1B where the switch 8B is disposed, and does not transmit the digital audio signal to the other speakers. Therefore, content (music) is output from the speaker 7B, and the content is not output from the speaker 7A and the speaker 7C.

By contrast, when the user enters the room 1A, as shown in FIG. 4B, the user operates the switch 8A. Information indicating the operation of the switch 8A is transmitted to the receiver 5. The receiver 5 transmits the digital audio signal to the speaker 7A of the room 1A where the switch 8A is disposed, and does not transmit the digital audio signal to the other speakers. Therefore, the content (music) is output from the speaker 7A, and the content is not output from the speaker 7B and the speaker 7C. Alternatively, the receiver 5 may not transmit the digital audio signal to the speaker 7B of the room in which the user stayed just before, so that only the outputting operation of the speaker of the room in which the user stayed just before is stopped.

As described above, the user is enabled only by operating a switch to continuously listen content which the user oneself has listened, also in the place to which the user moves.

Next, FIG. 5 is a diagram showing a mode in which a plurality of users are identified, and contents for the users are output in places where the respective users stay.

Figure 5A:
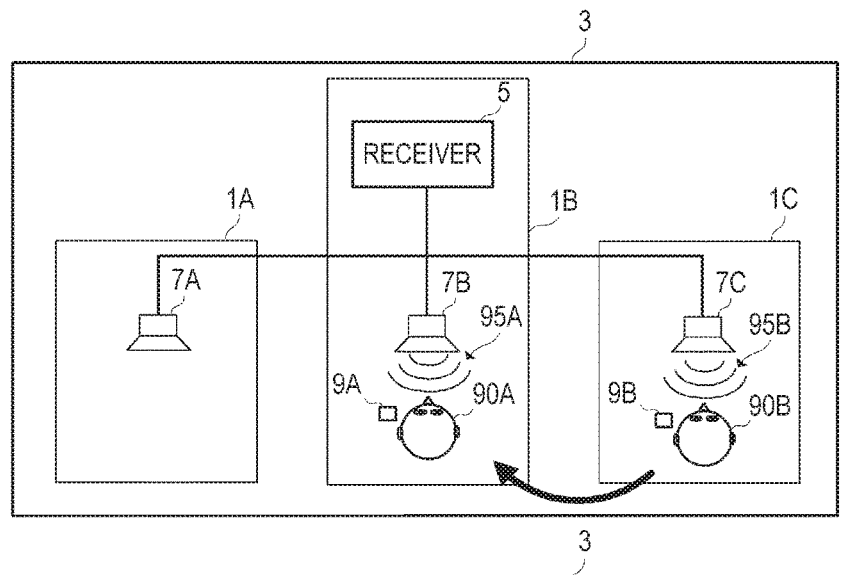
FIGS. 5A to 5C are diagrams showing a mode in which a plurality of users are identified, and contents for the users are output in places where the respective users stay.

In the state of FIG. 5A, a user 90A carrying a user terminal 9A stays in the room 1B, and a user 90B carrying a user terminal 9B stays in the room 1C. Each of the users previously operates the receiver 5 (or by using a terminal such as a smartphone) to select content to be reproduced. At this time, the controller 102 of the receiver 5 stores the identification information of content selected by each of the users, and the user identification information of the user, in the memory 103 while associating the sets of information with each other. In the case where content is selected by operating the receiver 5, the user identification information which is transmitted by the user terminal that is detected at this time as the terminal positioned at the closest distance from the receiver 5 (i.e., the speaker 7B) is associated with the content identification information. In the case where the operation is conducted by operating a terminal such as a smartphone, the user identification information is transmitted from the smartphone to the receiver 5, and then associated with the content identification information.

As shown in FIG. 5A, therefore, content 95A reproduction of which is instructed by the user 90A carrying the user terminal 9A is output in the room 1B, and content 95B reproduction of which is instructed by the user 90B carrying the user terminal 9B is output in the room 10.

Figure 5B:
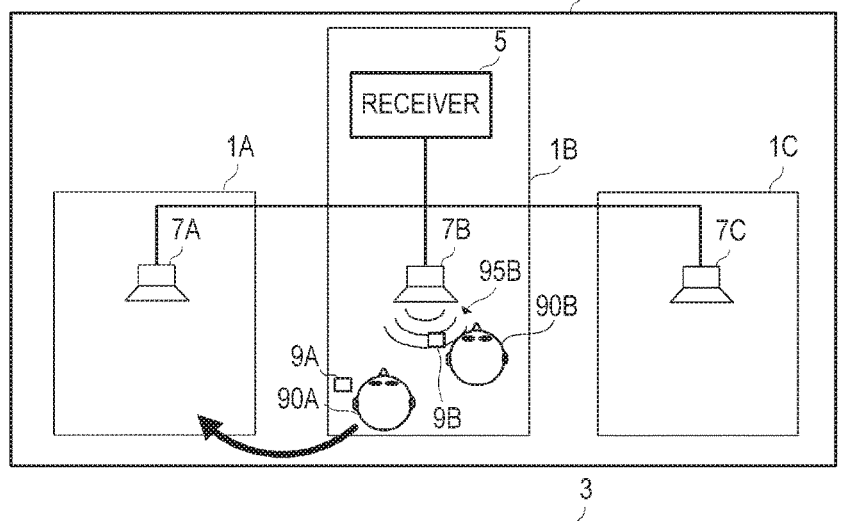

In the case where, as shown in FIG. 5B, the user 90B carrying the user terminal 9B then moves to the room 1B to be at the position which is closest to the speaker 7B, the controller 102 of the receiver 5 transmits a digital audio signal relating to the content 95B to the speaker 7B, and does not transmit the digital audio signal relating to the content 95B to the other speakers. In this state, that is, the output of the content 95A is stopped. Also in this state, however, the user identification information of the user 90A, and the content identification information of the content 95B are stored in the memory 103 while being associated with each other.

Figure 5C:
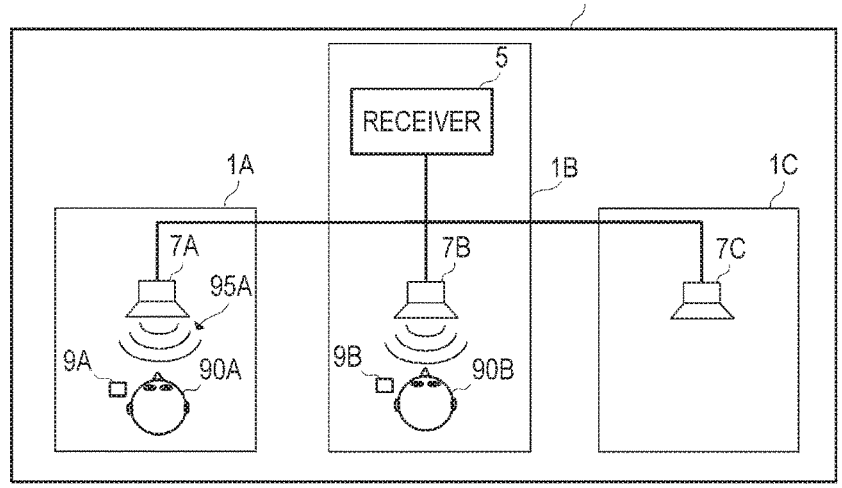

When the user 90A moves to the room 1A as shown in FIG. 5C, therefore, the user identification information of the user 90A is transmitted from the speaker 7A. Consequently, the controller 102 of the receiver 5 transmits a digital audio signal relating to the content 95A to the speaker 7A, and does not transmit the digital audio signal relating to the content 95A to the other speakers. After the user 90A moves to the room 1A, as a result, the user can listen the content 95A which the user has listened in the room 1B.

Next, FIG. 6 is a diagram showing a content reproduction system in the case where a network speaker 70A, a network speaker 70B, and a network speaker 70C are used in place of the receiver 5.

In the example, the network speaker 70A, the network speaker 70B, and the network speaker 70C are disposed in the room 1A, the room 1B, and the room 1C, respectively. The user carries a smartphone 81 as the user terminal. All of the network speaker 70A, the network speaker 70B, the network speaker 70C, and the smartphone 81 are connected to one another through a network.

Figure 7:
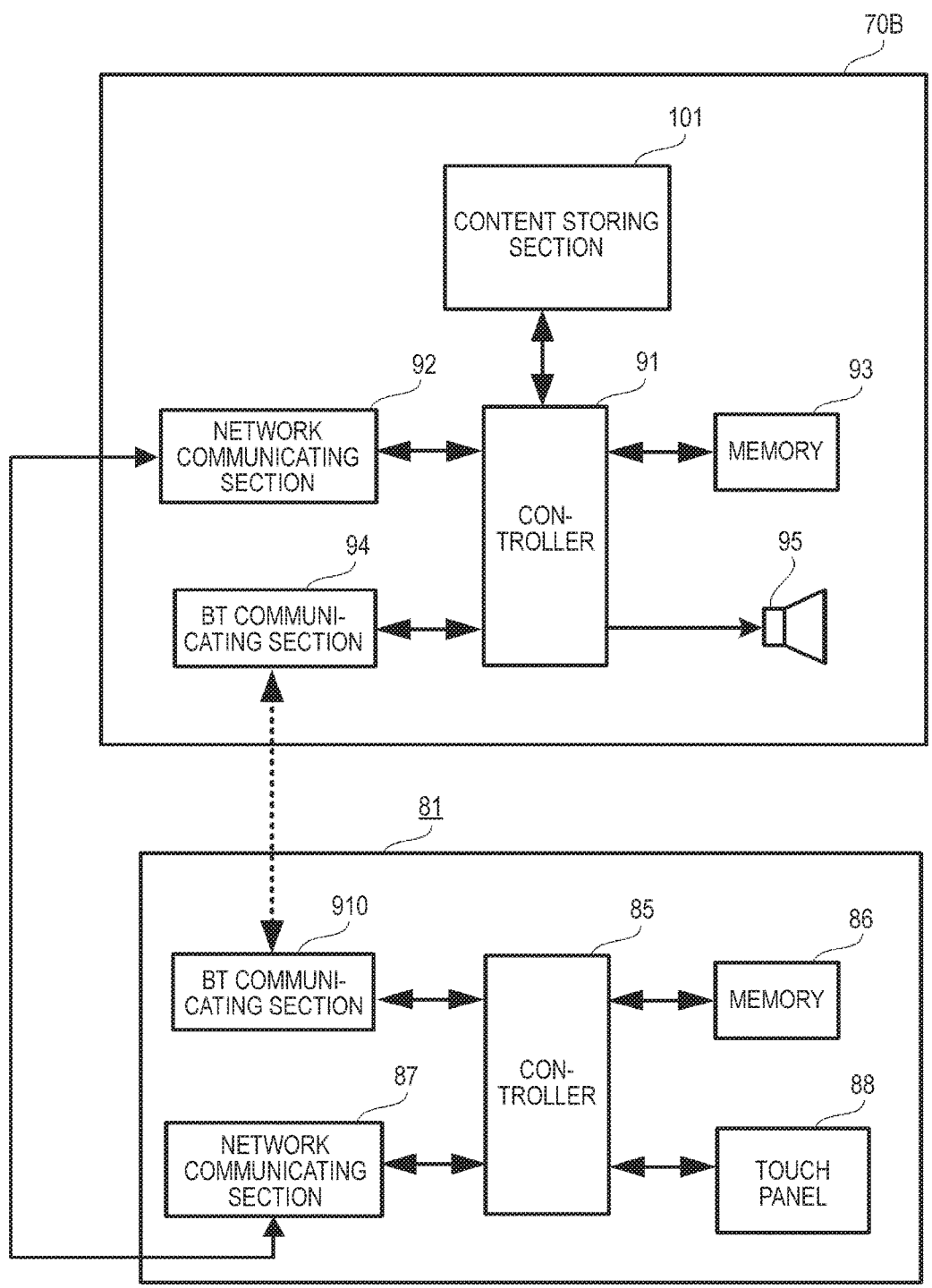
FIG. 7 is a block diagram showing the configuration of a network speaker.

FIG. 7 is a block diagram showing the main configurations of the network speaker 70B and the smartphone 81. Although FIG. 7 typically shows the configuration of the network speaker 70B, all of the network speaker 70A, the network speaker 70B, and the network speaker 70C have the same configuration and function.

The network speaker 70B includes the configuration same as that of the speaker 7B, and further includes a content storing section 101. The smartphone 81 includes, in addition to the configuration of the user terminal 9, a controller 85, a memory 86, a network communicating section 87, and a touch panel 88.

The memory 86 stores programs (an OS and application programs) for operating the smartphone 81. The controller 85 reads out the programs stored in the memory 86, and controls the operation of the smartphone 81. Based on an operation of the user which is received through the touch panel 88, for example, the controller 85 displays a predetermined image on the touch panel 88.

All of the network speaker 70A, the network speaker 70B, the network speaker 70C, and the smartphone 81 are connected to one another through the network.

The user operates the touch panel 88 to instruct the system to reproduce arbitrary one of the contents stored in the content storage section 101.

The content storing section 101 is not required to be included in all of the network speaker 70A, the network speaker 70B, and the network speaker 70C, but requested to be included in one of the network speakers. Alternatively, the content storing section 101 may be disposed in the smartphone 81.

The controller 91 of the network speaker 70B reads out content from the content storing section 101 which is instructed by the user.

Figure 6A:
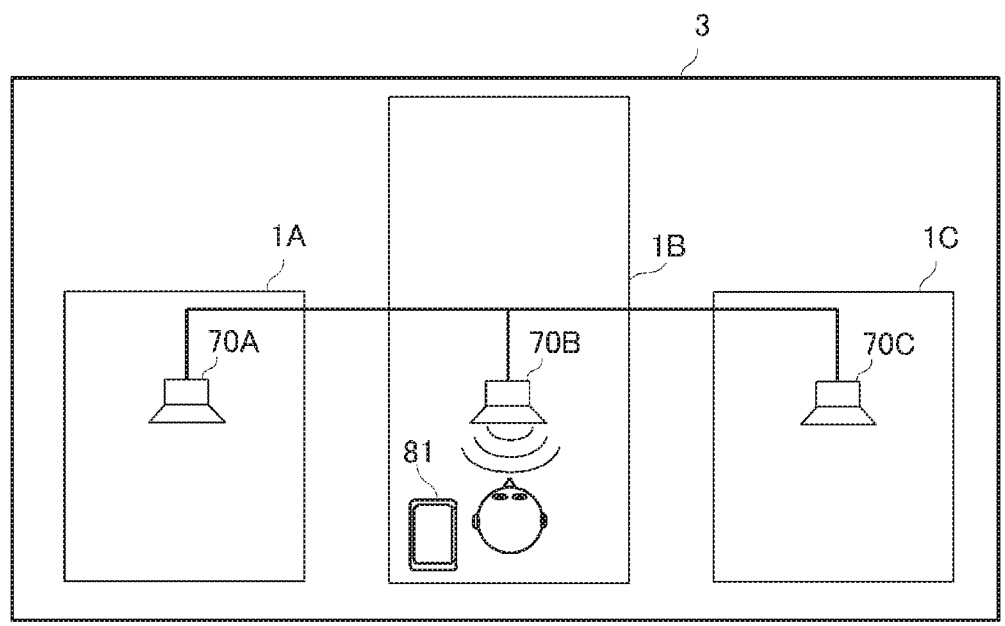
FIGS. 6A and 6B are diagrams showing a content reproduction system in the case where network speakers are used.

The controller 91 outputs an audio signal related to the reproduced content to the speaker unit 95 of the own speaker, or to another network speaker through the network communicating section 92. In the example of FIG. 6A, the controller 91 outputs the audio signal to the speaker unit 95 of the own speaker.

The content reproduction system of the example operates in the same manner as that shown in FIG. 1 and the network speaker 70B operates as the master unit in the same manner as the receiver 5. In the case where the user stays in the room 1B as shown in FIG. 6A, namely, the speaker 7B is closest to the smartphone 81 (corresponding to the user terminal 9 in FIG. 1). Therefore, content (music) is output from the network speaker 70B, and the content is not output from the network speaker 70A and the network speaker 70C.

Figure 6B:
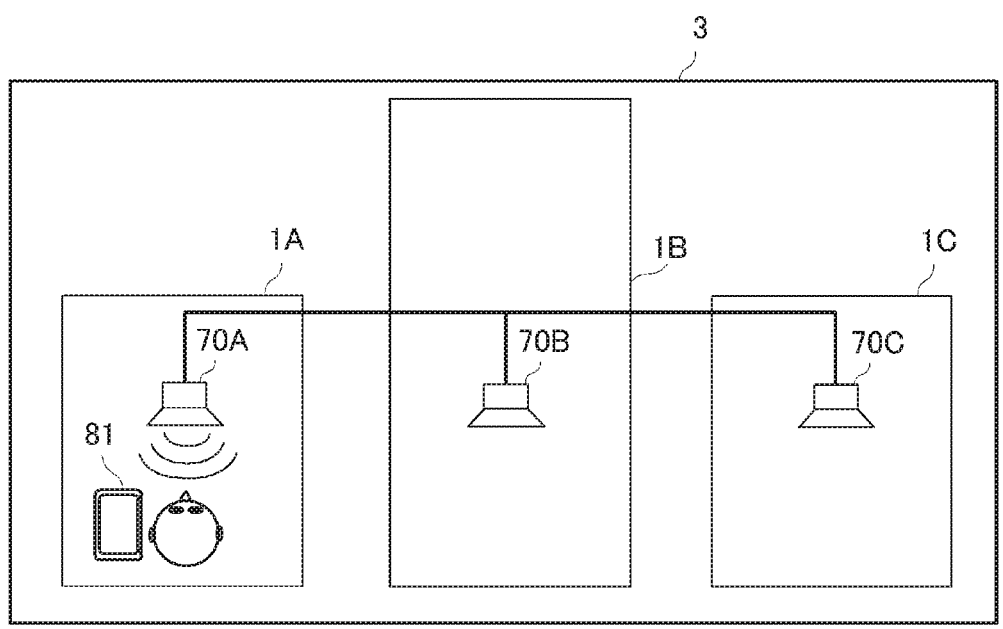

By contrast, when the user moves to the room 1A as shown in FIG. 6B, for example, the network speaker 70A is closest to the smartphone 81. Therefore, the controller 91 of the network speaker 70B transmits the digital audio signal to the network speaker 70A which is closest to the user terminal (smartphone 81), and does not output the digital audio signal to the other speakers. As a result, the content (music) is output from the network speaker 70A, and the content is not output from the network speaker 70B and the network speaker 70C.

The smartphone 81 may operate as the master unit in a similar manner as the receiver 5. In this case, the controller 85 of the smartphone 81 reads out content from the content storing section 101 disposed in the own device (or one of the network speakers), reproduces the content, transmits a digital audio signal to the network speaker which is closest to the user terminal (smartphone 81), and does not transmit the digital audio signal to the other speakers. In this case, the speakers (or the switches disposed in the rooms) transmit beacon signals according to the BLE, and the smartphone 81 calculates the distances based on the reception radio wave intensities of the beacon signals, and determines the speaker which is closest to the user terminal. Alternatively, the speakers (or the switches disposed in the rooms) receive a beacon signal output from the user terminal, and transmit the reception radio wave intensities of the beacon signal to the smartphone 81, and the smartphone 81 calculates the distances, and determines the speaker which is closest to the user terminal.

Also in the case where network speakers are used, as shown in FIG. 8, the place to which the user belongs can be detected by using switches (operation receiving sections) disposed in the rooms. In the example of FIG. 8, however, the switches are connected to the network speakers of the rooms, respectively.

Figure 8A:
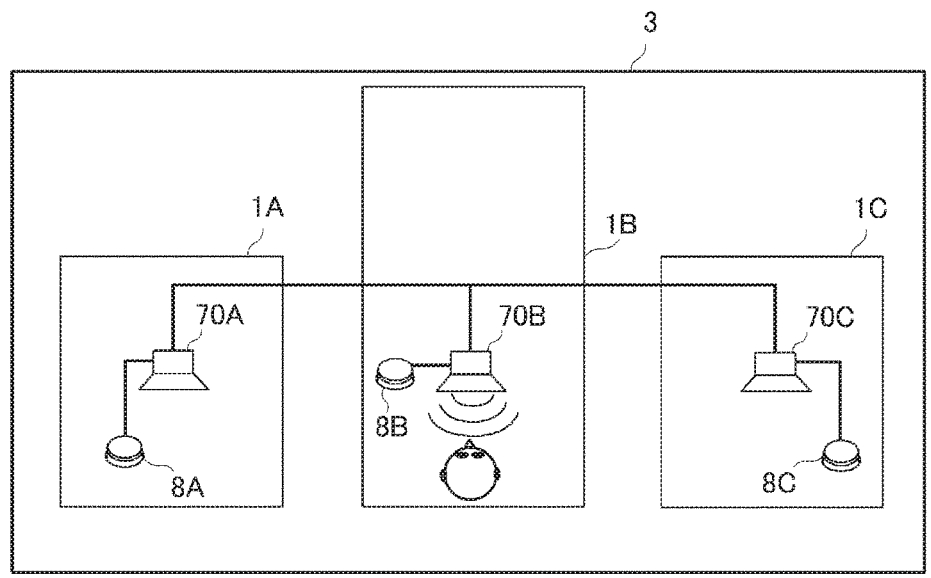
FIGS. 8A and 8B are diagrams showing a mode in which a place to which the user belongs is detected by using switches (operation receiving sections) disposed in rooms.

In the state of FIG. 8A, when the user enters the room 1B, the user operates the switch 8B. Information indicating the operation of the switch 8B is transmitted to the network speaker 70B which is the master unit. The network speaker 70B outputs content from the own device, and does not transmit a digital audio signal to the other network speakers. Therefore, content (music) is output from the network speaker 70B, and the content is not output from the network speaker 70A and the network speaker 70C.

Figure 8B:
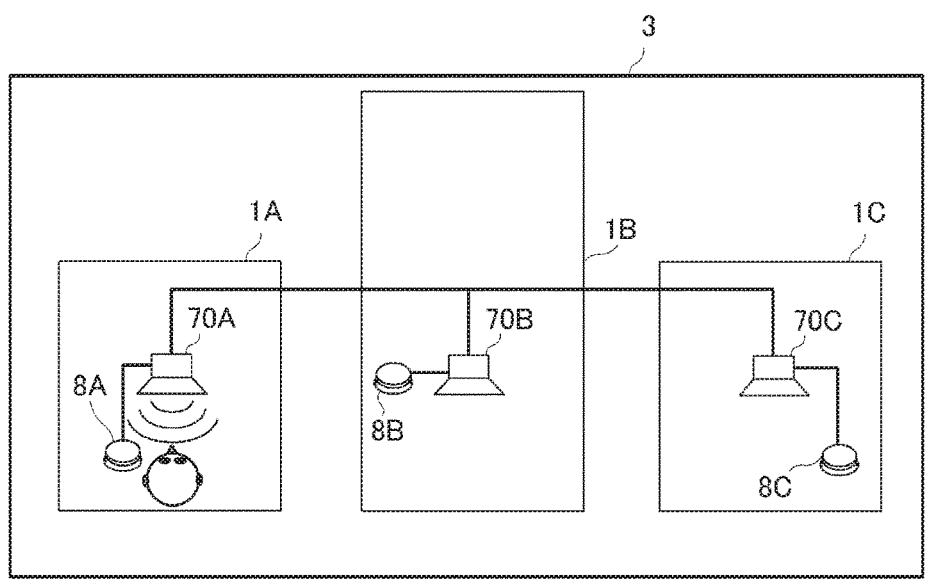

When the user then moves to the room 1A as shown in FIG. 8B, and operates the switch 8A, the network speaker 70A connected to the switch 8A makes inquiries by means of multicast (the method of simultaneously inquiring of all devices). Then, the network speaker 70B which is the master unit checks the content identification information stored in the memory 93, and transmits the content identification information (or the digital audio signal relating to the content) to the network speaker 70A. Moreover, the network speaker 70B stops the output of content in the own device. As a result, the network speaker 70A outputs the content which is identical with the content that was output from the network speaker 70B of the room 1B in FIG. 8A. At this time, the master unit may be switched to the network speaker 70A.

The mode in which a receiver is used as shown in FIGS. 1 to 5, and that in which network speakers are used as shown in FIGS. 6 to 8 may be combined with each other. In this case, the receiver 5 functions as the master unit, and causes the speakers or network speakers which are connected to the receiver to output content.

Next, FIG. 9 is a diagram showing an example of a case where a receiver and speakers are connected to one another through analog audio cables. FIG. 10 is a block diagram showing the configurations of the receiver, the speakers, a beacon terminal, and a user terminal (smartphone). A receiver 50 in the example further includes an output I/F 106. The output I/F 106 is connected to the speaker 7A, the speaker 7B, and the speaker 7C through the analog audio cables, and outputs analog audio signals. The speaker 7A, the speaker 7B, and the speaker 7C output sounds which are based on the input analog audio signals, and do not include complicated configurations and functions for other purposes.

A beacon terminal 80A, a beacon terminal 80B, and a beacon terminal 80C have the same configuration and function. FIG. 10 typically shows the configuration of the beacon terminal 80B. The beacon terminal 80B includes a controller 801, a network communicating section 802, a memory 803, and a BT communicating section 804, and has the configuration same as that of the speaker 7B. The smartphone 81 has the configuration and function which are identical with those of the example shown in FIG. 7.

Figure 9A:
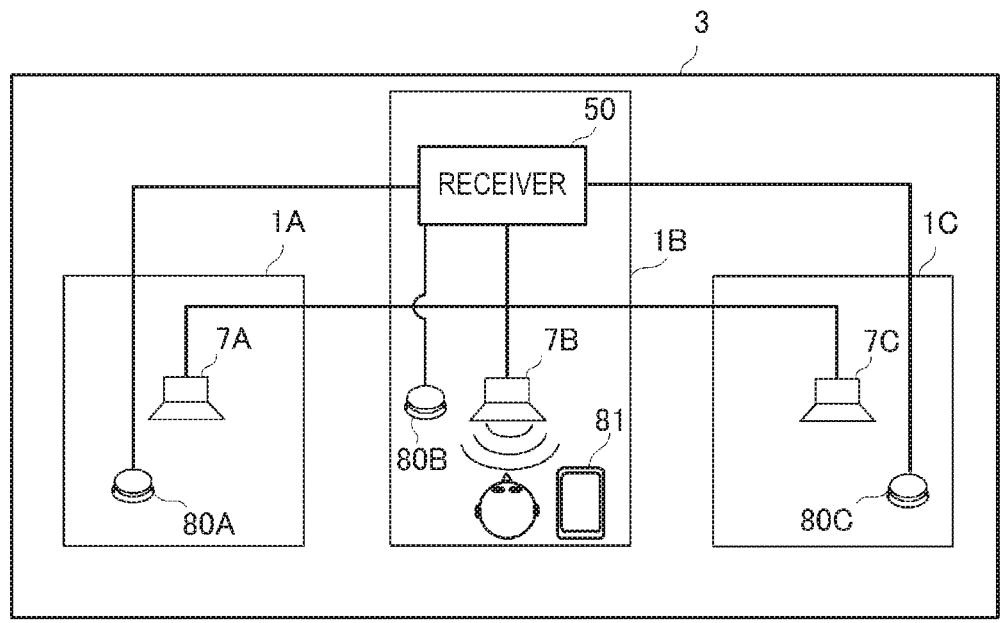
FIGS. 9A and 9B are diagrams showing an example of a case where a receiver and speakers are connected to one another through analog audio cables.
Figure 10:
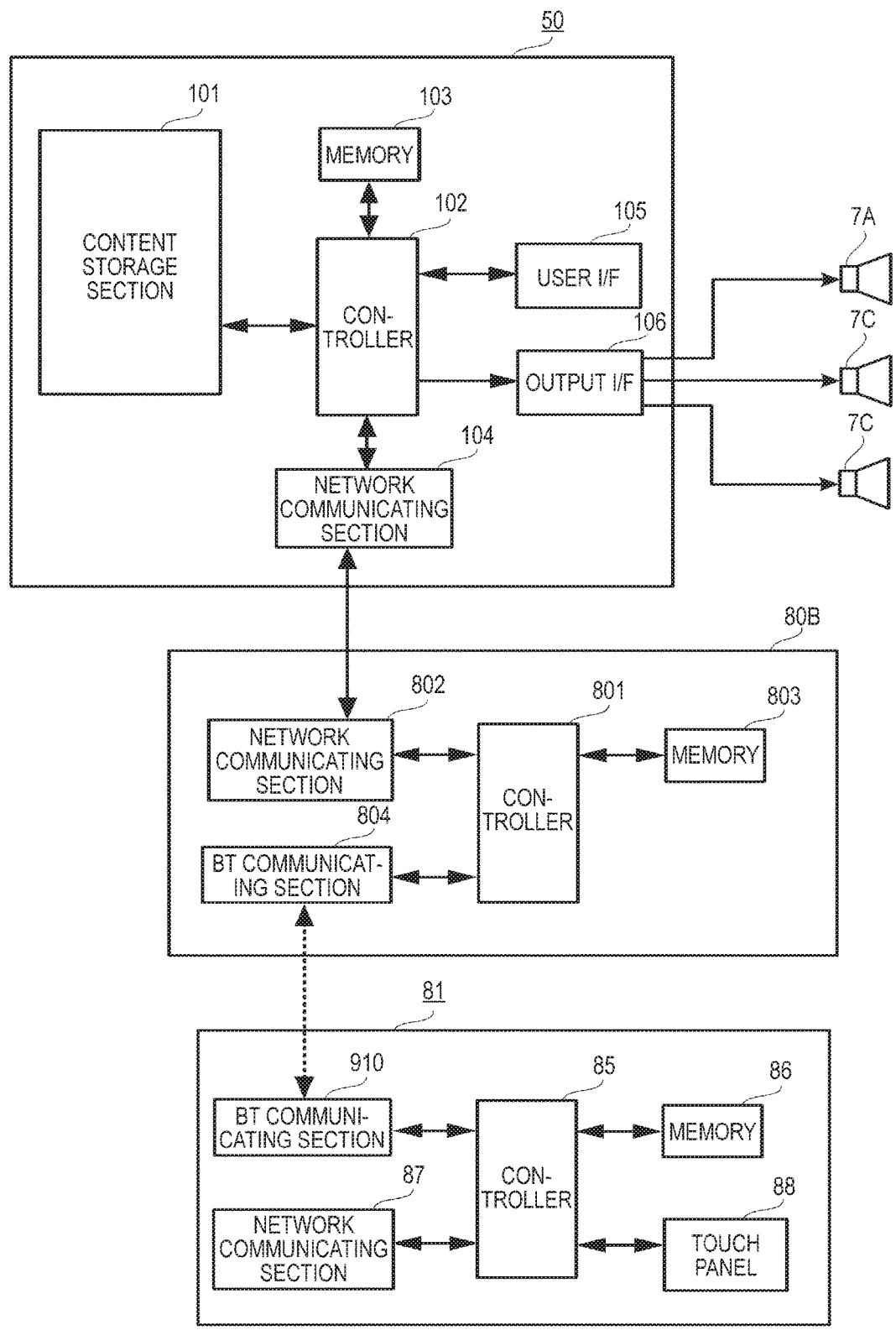
FIG. 10 is a block diagram showing the configurations of the receiver, the speakers, a beacon terminal, and a user terminal (smart phone).

In the content reproduction system of the example, in the state of FIG. 9A, the user operates the touch panel 88 of the smartphone 81 when the user enters the room 1B. Then, the smartphone 81 transmits a beacon signal according to the BLE through the BT communicating section 910. The beacon terminal 80B receives the beacon signal, and calculates the distance with respect to the smartphone 81 based on the reception radio wave intensity of the beacon signal. The information of the calculated distance is transmitted to the receiver 50. Alternatively, the beacon terminal 80B may transmit a beacon signal according to the BLE, and the smartphone 81 may calculate the distance with respect to the beacon terminal 80B based on the reception radio wave intensity of the received beacon signal, and transmit information of the distance with respect to the beacon terminal 80B to the receiver 50.

Consequently, the receiver 50 determines that the user stays at the position which is closest to the beacon terminal 80B, further determines that the user stays in the room 1B where the beacon terminal 80B is disposed, that is, the speaker 7B is disposed, outputs an audio signal to the speaker 7B, and stops the outputting operations of the other speaker 7A and speaker 7C (mutes the outputs).

Figure 9B:
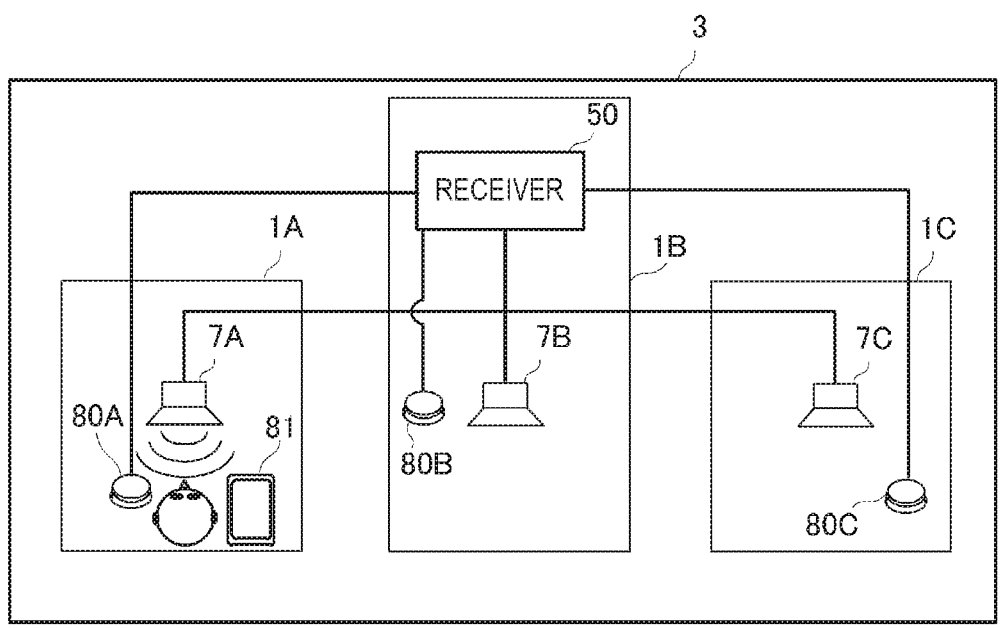

When the user then moves to the room 1A as shown in FIG. 9B, and operates the smartphone 81, the distance information is transmitted from the beacon terminal 80A to the receiver 50. Therefore, the receiver 50 determines that the user stays in the room 1A where the beacon terminal 80A is disposed, that is, the speaker 7A is disposed, outputs the audio signal to the speaker 7A, and stops the outputting operations of the other speaker 7B and speaker 7C (mutes the outputs), or stops the outputting operation of the speaker 7B of the room 1B in which the user stayed just before.

In a content reproduction system of any of the modes, as described above, the user can continue to listen content which the user oneself has listened, also in a place after movement without requiring the user to perform cumbersome operations.

Although, in the above-described embodiment, the mode in which an audio signal is output from the speakers, that is, audio content is output has been described, the invention can be applied also to video content. When the speakers are replaced with video apparatuses such as television receivers, for example, video content can be output.

Although, in the above-described embodiment, the receiver 5 has been described as an example of the content reproduction apparatus, the invention is not limited to this. For example, a partial function of the receiver 5 may be separated, and the separated function may be disposed in another apparatus. The invention may be applied also to a content reproduction program which causes a computer to execute the sections and functions of the above-described content reproduction apparatus.

It is possible to provide a content reproduction apparatus which, without requiring cumbersome operations, can reproduce content that a specific user instructs to be reproduced, in a place corresponding to movement of the specific user.

Here, the details of the above embodiments of the disclosure are summarized as follows.

[1] The disclosure provides a content reproduction apparatus comprising:

a content reproducer configured to reproduce content;

a user identifier configured to identify a specific user;

a determiner configured to determine a place to which the specific user belongs, based on information of a distance with respect to a terminal carried by the specific user, and a result of identification performed by the user identifier; and a controller configured to, based on the information of the distance with respect to the terminal, cause the content to be output in the place to which the specific user belongs, and inhibit the content from being output in another place.

As described above, the content reproduction apparatus identifies the specific user, causes content to be reproduced in the place to which the specific user belongs, based on the distance with respect to the terminal carried by the specific user, and inhibits the content from being reproduced in another place(s). According to the configuration, the specific user can continue to listen the content that the specific user oneself has listened, also in the place to which the specific user moves. Even in the case where a plurality of persons stay, the content is output only in a place where the specific user stays.

The place to which the specific user belongs can be detected by detecting the position of the terminals carried by the users. As the technique for detecting the position of a terminal, for example, a technique in which the GPS is used may be employed, or that in which the radio wave intensity in a wireless LAN, the Bluetooth (registered trademark), or the like is used may be employed.

The user identifier may identify a plurality of specific users. In this case, the determiner determines places to which the specific users belong, respectively, and, based on the respective distances with respect to the terminals carried by the specific users, the controller causes content corresponding to the specific user who carries the closest terminal, to be output, and inhibits contents corresponding to the other specific users, from being output. Alternatively, the determiner detects the respective places to which the specific users belong, and the controller causes contents of the specific users to be output in the places where the specific users stay, respectively.

When the operation of outputting content is stopped, the controller may store identification information of the content the output of which is stopped, and information of the specific user corresponding to the stopped content, in a memory. According to the configuration, in the case where, in a situation where a first specific user listens first content in a first room, a second specific user moves to the first room, and, in the first room, the operation of outputting the first content is stopped, and second content is output, when the first specific user then moves to another room (a second room), the first content can be again reproduced in the second room.

[2] For example, the content reproducer is connected to a plurality of content reproduction units, and the controller is configured to cause a content reproduction unit of the content reproduction units to reproduce the content, the content reproduction unit being in the place to which the specific user belongs, and inhibits the content from being reproduced in the another place.

[3] For example, the user identifier is configured to identify a plurality of specific users, the determiner is configured to determine places to which the specific users belong, respectively, and based on distances with respect to terminals carried by the specific users, the controller is configured to cause content corresponding to a specific user carrying a closest terminal, to be output, and inhibit content corresponding to another specific user from being output.

[4] For example, the user identifier is configured to identify a plurality of specific users, the determiner is configured to determine places to which the specific users belong, respectively, and the controller is configured to cause content of each of the specific users to be output in each place where each of the specific user stays.

[5] For example, when an operation of outputting content is stopped, the controller is configured to store identification information of the stopped content, and information relating a specific user corresponding to the stopped content, in a memory.

[6] The disclosure provides a content reproduction method comprising:
    identifying a specific user;
    determining a place to which the specific user belongs, based on information of a distance with respect to a terminal carried by the identified specific user, and a result of identification of the specific user; and
    based on the information of the distance with respect to the terminal, performing a control to output content in the place to which the specific user belongs, and a control to inhibit an outputting of the content in another place(s).

[7] The disclosure provides a non-transitory computer-readable storage medium, which includes a content reproduction program that causes a computer to execute the content reproduction method.

[8] The disclosure provides a content reproduction program which causes a computer to execute the steps of:
    identifying a specific user;
    determining a place to which the specific user belongs, based on information of a distance with respect to a terminal carried by the identified specific user, and a result of identification of the specific user; and
    based on the information of the distance with respect to the terminal, performing a control to output content in the place to which the specific user belongs, and a control to inhibit an outputting of the content in another place(s).

The invention claimed is:

1. A content reproduction apparatus comprising:
   a content reproducer configured to reproduce content;
   a user identifier configured to identify a plurality of specific users;
   a determiner configured to determine a place to which each of the plurality of specific users belongs, based on information of a distance between the content reproducer and a terminal carried by each of the plurality of specific users, and a result of identification performed by the user identifier; and
   a controller configured to, based on the information of the distance between the content reproducer and the terminal carried by each of the plurality of specific users, cause the content to be output in the place to which a specific user carrying a terminal that is closest to the content reproducer belongs, and inhibit the content from being output in another place.

2. The content reproduction apparatus according to claim 1, wherein
   the content reproducer is connected to a plurality of content reproduction units; and
   the controller is configured to cause a content reproduction unit of the content reproduction units to reproduce the content, the content reproduction unit being in the place to which the specific user belongs, and inhibits the content from being reproduced in the another place.

3. The content reproduction apparatus according to claim 1, wherein
   the controller is configured to cause content of each of the specific users to be output in each place where each of the specific user stays.

4. The content reproduction apparatus according to claim 1, wherein,
   when an operation of outputting content is stopped, the controller is configured to store identification information of the stopped content, and information relating a specific user corresponding to the stopped content, in a memory.

5. A content reproduction method comprising:
   identifying a plurality of specific users;
   determining a place to which each of the plurality of specific users belongs, based on information of a distance between the content reproducer and a terminal carried by each of the plurality of specific users, and a result of identification of each of the plurality of specific users; and
   based on the information of the distance between the content reproducer and the terminal carried by each of the plurality of specific users, performing a control to output content in a place to which a specific user carrying a terminal that is closest to the content reproducer belongs, and a control to inhibit an outputting of the content in another place.

6. A non-transitory computer-readable storage medium, which includes a content reproduction program that causes a computer to execute the content reproduction method according to claim 5.

* * * * *